Figure 1:
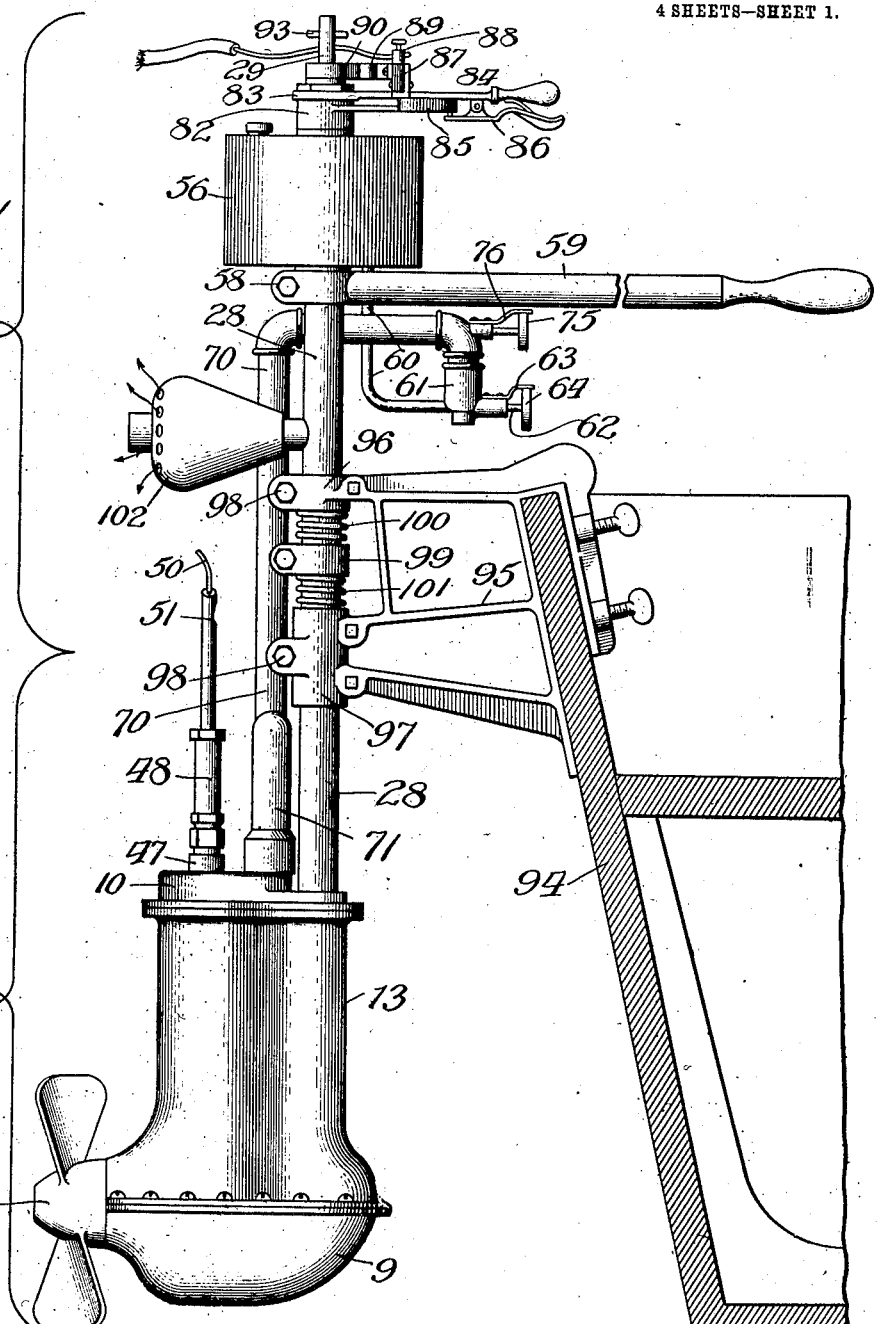

No. 871,459. PATENTED NOV. 19, 1907.
T. THORSEN.
BOAT PROPELLING MECHANISM.
APPLICATION FILED MAR. 1, 1907.

4 SHEETS—SHEET 1.

Witnesses:

Inventor:
Thomas Thorsen,

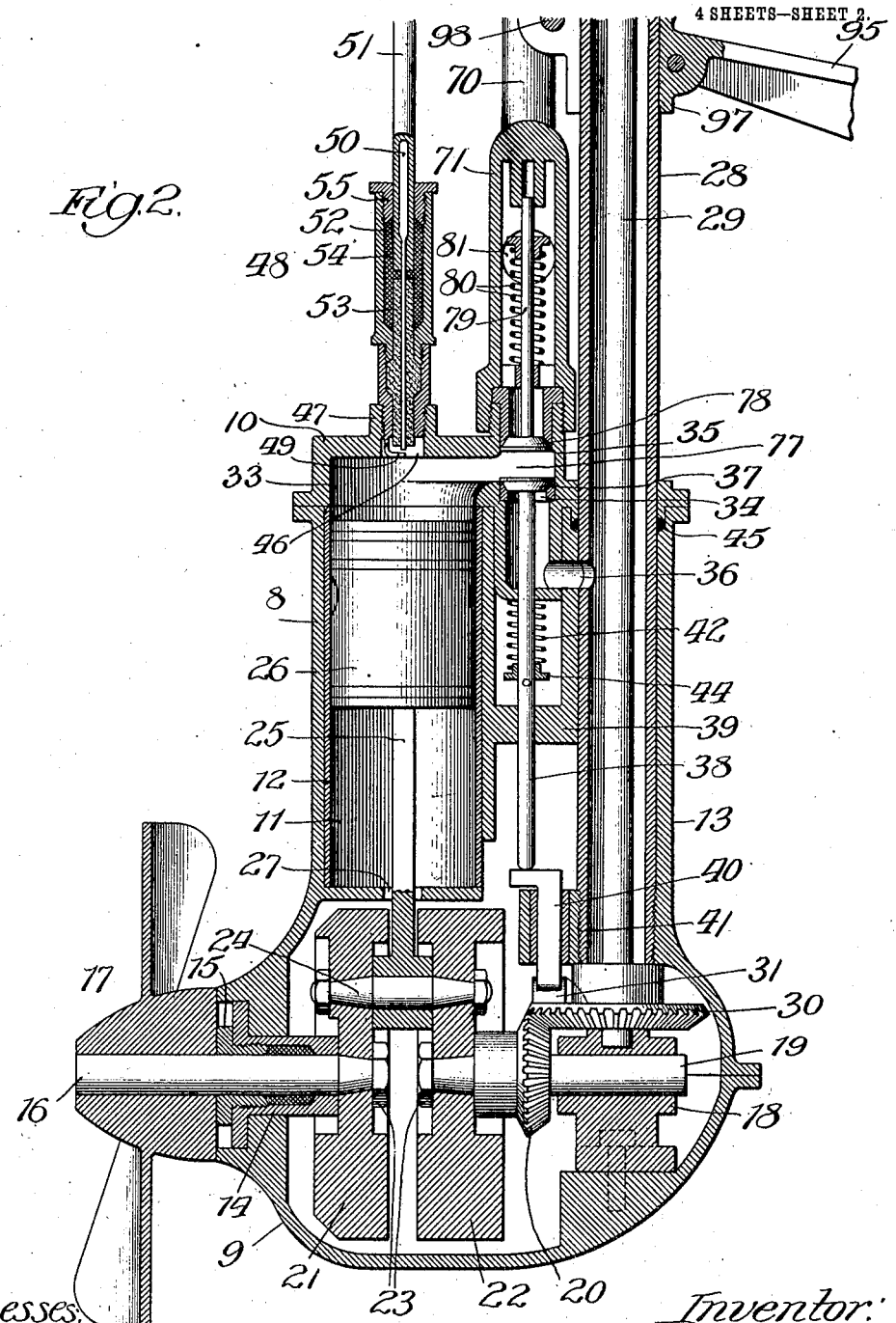

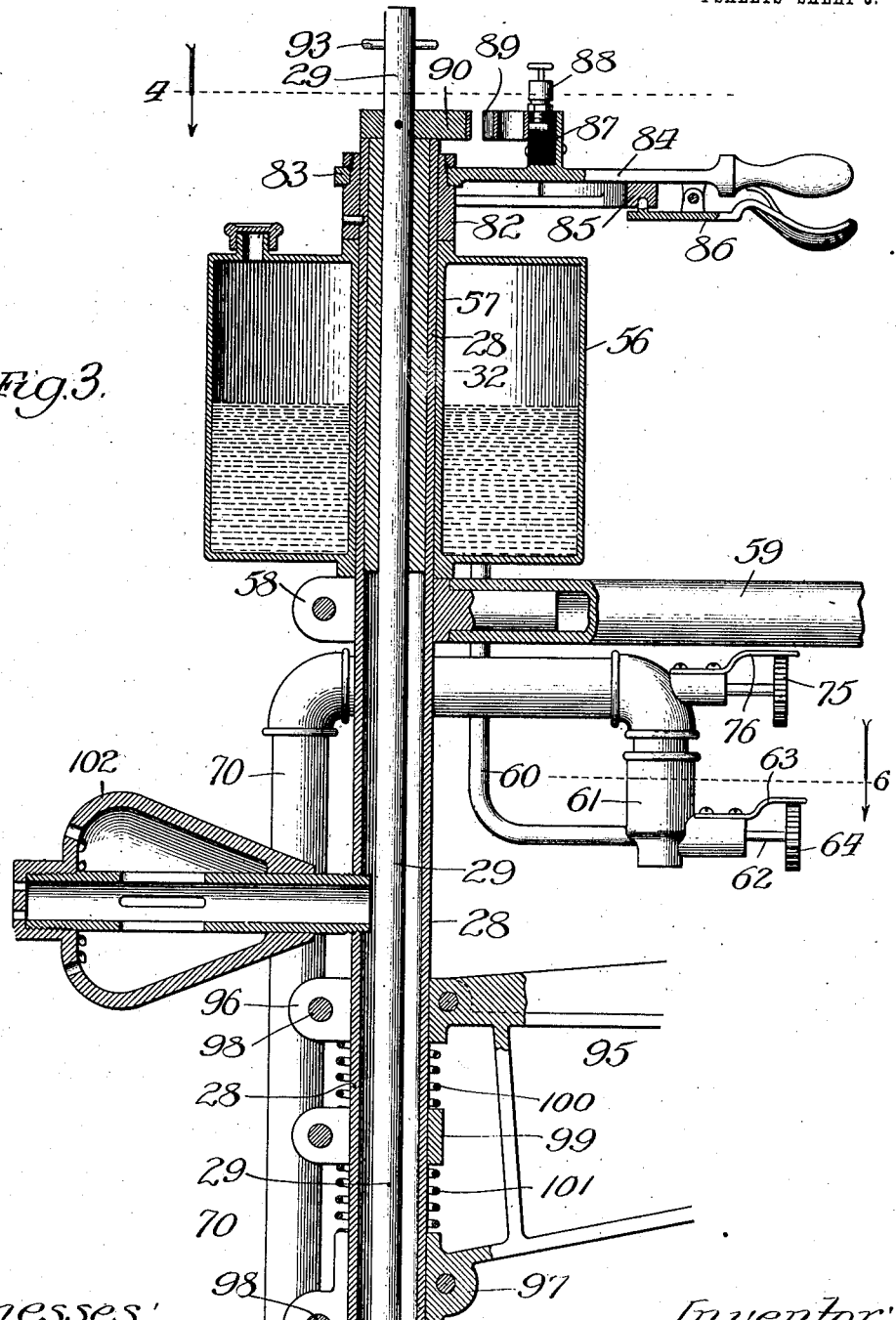

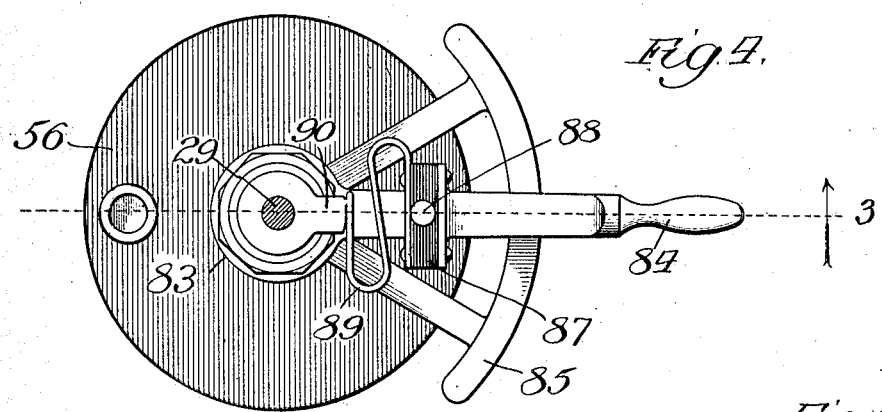
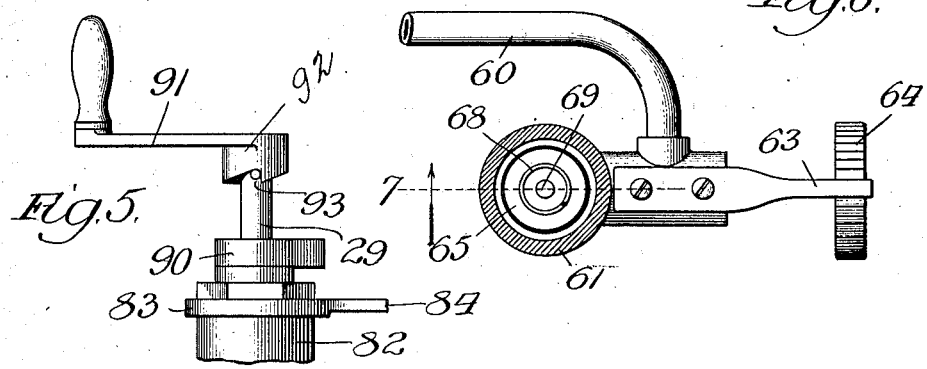
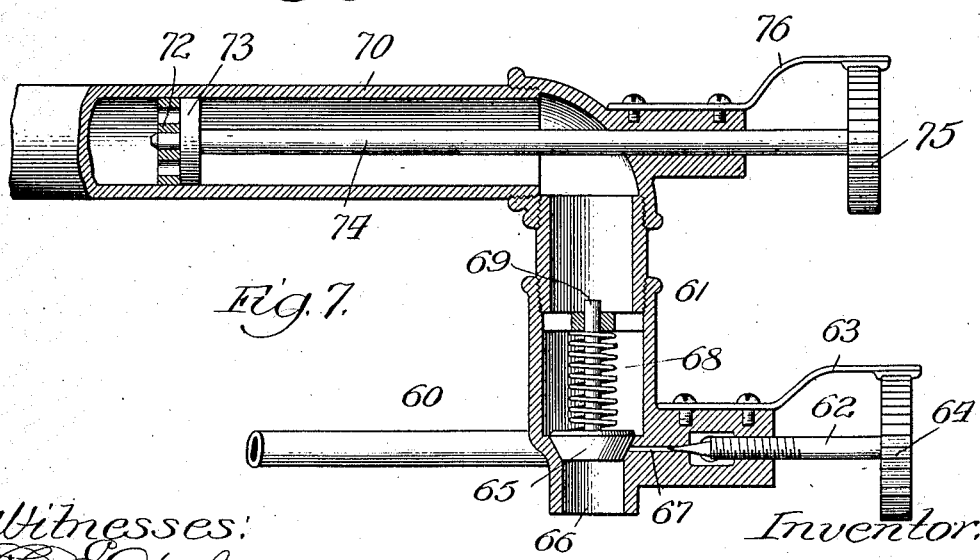

UNITED STATES PATENT OFFICE.

THOMAS THORSEN, OF MENOMONIE, WISCONSIN, ASSIGNOR TO SUBMERGED ELECTRIC MOTOR COMPANY, OF MENOMONIE, WISCONSIN, A CORPORATION OF WISCONSIN.

BOAT-PROPELLING MECHANISM.

No. 871,459.     Specification of Letters Patent.     Patented Nov. 19, 1907.

Application filed March 1, 1907. Serial No. 360,113.

*To all whom it may concern:*

Be it known that I, THOMAS THORSEN, a citizen of the United States, residing at Menomonie, in the county of Dunn and State of Wisconsin, have invented a new and useful Boat-Propelling Mechanism, of which the following is a specification.

The object of my invention is to provide a novel and improved construction, in matters of detail, of a combined gas-engine and boat-propeller, in a light and compact structure adapted for ready application to and removal from the stern-board of a boat to operate, when in place, as the propelling and steering means therefor.

Referring to the accompanying drawings—Figure 1 shows my improved motor in side elevation removably secured to the stern-board of a boat, of which a broken section is represented; Fig. 2, a view in vertical sectional elevation of the lower part of my improved motor, being the portion thereof embraced by the bracket 2 on Fig. 1; Fig. 3, a similar view of the upper part of my improved motor, being the portion thereof embraced by the bracket 3 on Fig. 1, this view being a continuation of the view presented by Fig. 2 and, like the latter, taken in the plane indicated by the line 3 on Fig. 4 and viewed in the direction of the arrow; Fig. 4, a section taken at the line 4 on Fig. 3 and viewed in the direction of the arrow; Fig. 5, a broken view in elevation showing the starting crank; Fig. 6, a section through the carbureter taken at the line 6 on Fig. 3 and viewed in the direction of the arrow, and Fig. 7, a section taken at the line 7 on Fig. 6 and viewed in the direction of the arrow.

The casing of the engine is a casting, preferably of aluminium for the sake of lightness, consisting of the intermediate body-portion 8, a cap 9 secured on the lower expanded end of the body, and a cap 10 secured on its upper end. The intermediate section 8 contains the cylinder 11 provided with an internal bushing 12, and is also formed, laterally of the cylinder, with a tubular socket 13, shown to be internally threaded at its lower end, for the purpose hereinafter explained. In the junction between the cap 9 and the body 8 is formed a bearing 14, rendered water-tight by a stuffing-box 15, for a rotary shaft 16 carrying on its outer end the propeller 17, the hub of which has close bearing against the casing, as shown. In line with the shaft 16 in the opposite side of the casing, is journaled in a bearing 18, a rotary shaft 19 carrying a vertically disposed bevel-gear 20. The shafts 16 and 19 pass, at their reduced, tapered inner ends, through the centers of fly-wheels 21 and 22, respectively, at the inner sides of which the shafts are secured by nuts 23. A wrist-pin 24 passes eccentrically through the fly-wheels and has journaled upon it the lower end of the rod 25 of the piston 26 in the cylinder 8, in the bottom of which is an opening 27 through which the piston-rod works. A tube 28 is supported in the socket 13, being screwed at its threaded lower end therein, or otherwise rigidly fastened in said socket to adapt it to carry all the parts of the mechanism of the motor and afford a stem through which to support it rotatably, as hereinafter described, upon a boat. A rod 29, for operating the starting and sparking mechanisms, as hereinafter explained, extends through the vertical tube 28 and seats in the bearing 18 rotatably at its lower end, on which it carries the bevel-gear 30 confined by the adjacent end of the tube in engagement with the gear 20 and carrying on its upper face a cam 31. In the upper part of the tube 28 is a bushing 32 in which the rod 29 finds bearing.

The cap 10 forms the explosion chamber 33 having an exhaust-outlet 34 provided in a neck 35 extending downwardly from this cap and containing a discharge-port 36 for the exhaust leading through the socket 13 and tube 28 into the latter. An upwardly opening valve 37 seats in the outlet 34 and has a depending stem 38 passing guidingly through the base of the neck 35 and through a bearing 39 projecting laterally from the cylinder 8 to engage at its lower end with the head of a plunger 40 confined in a bearing 41 in the casing to adapt it to be vertically reciprocated under the action of the cam 31, into the path of which the lower end of the plunger extends. The valve 37 is seated by a spring 42 confined between the base of the neck 35 and a collar 44 on the stem.

At the junction of the cap 10 with the upper end of the socket 13 is a stuffing-box 45, affording a water-tight joint under the pressure of the cap when bolted down in place.

The cap 10 has projecting about an opening 46 in it a nipple 47, into which is screwed the lower end of a sparking-plug 48 carrying a terminal 49, the other terminal 50 being contained in an insulating tube of soft rubber 51 which extends partway through the plug into the chamber 52 therein, and mica or other insulation 53 surrounds the terminal 50 from a point near which the tubing 51 terminates. The chamber 52 is filled with asphaltum 54, which also enters the space between the insulating media 51 and 53, and is confined by a gland 55 in the upper end of the sparking-plug casing. It is found in practice that the soft rubber tube around the high-tension wire 50, embedded in asphalt 54 in the sparking-plug, affords a perfectly water-tight insulation.

The gasolene for supplying the engine is contained in a supply-tank 56 having a central tubular opening 57 at which it surrounds the stem 28, seating about the lower end of the opening against the head 58 of the tiller 59, at which head the tiller is securely fastened upon the stem. A pipe 60 leads from the base of the gasolene-tank 56 into a carbureter 61 in which a needle-valve 62 works for the usual purpose, being held in adjusted position by a spring 63 bearing against its circumferentially notched hand-wheel 64. A valve 65 in the carbureter seats in the air-inlet opening 66, and when seated closes the gasolene inlet-passage 67 controlled by the needle-valve 62, and is pressed against its seat by a spring 68 surrounding its stem 69. The carbureter communicates with a mixing-tube 70 which leads horizontally, just below the plane of the tiller, and thence downwardly to the mixing-chamber 71, hereinafter described. The horizontal portion of the mixing-tube 70 contains a perforated diaphragm 72, against which works a rotary perforated disk-valve 73, for the usual purpose of controlling the flow through the tube, by regulating the registration of the perforations in the valve with those in the diaphragm. The valve 73 is on a stem 74 provided on its outer end with a circumferentially notched hand-wheel 75, and a spring 76 engages the hand-wheel for holding the valve in adjusted position.

The mixing-chamber 71 seats on the engine-cap 10 over an opening 77 therein directly over the valve 37 and has seated in it a downwardly opening valve 78 on a stem 79 working in guides in the mixing-chamber and having confined about it therein a spring 80 tending to maintain the valve against its seat. The mixing-chamber contains a port 81 with which the lower end of the depending portion of the mixing-tube 70 is connected.

On the upper end of the tubular stem 28 is secured a bearing-collar 82 rotatably surrounded by the annular head 83 of the handle 84 of the device for operating the sparking-plug. This handle is adapted to be turned on a segment 85 supported on arms extending horizontally from the collar 82, to adapt the segment to be engaged, as represented in Fig. 3, by a spring-pressed dog 86 fulcrumed on the handle. Near its inner end the handle 84 is surmounted by an insulated block 87 carrying a binding-post 88 forming one terminal of a sparking-coil (not shown). On this block is fastened a metal contact-spring 89, shown of S-shape, extending at its free end-portion into the path of a contact-finger 90 on the rotary starting-rod 29, whereby when this spring and finger are brought into contact, the course of the current is through the metal casing of the motor to the terminal 49 of the sparking-plug and thence to the terminal 50 which forms the return-wire.

For manually starting the motor the usual form of device shown in Fig. 5 is provided, consisting of a crank-handle 91 applied to the upper end of the rod 29 to engage at its notched head 92 with a pin 93 extending transversely through the rod.

For attaching the motor to the stern-board 94 of a boat, it is provided with a bracket 95, adapted to be removably attached to the stern-board, as clearly represented in Fig. 1. This bracket is provided with upper and lower split collars 96 and 97, to surround the stem 28 near its upper end, being fastened by bolts 98, 98, passed through their projecting ears. The entire motor is sustained yieldingly by the tube 28 on the bracket through the medium of a spring-cushion support, consisting of a collar 99 rigidly but adjustably fastened about the tubular stem and having confined between it and the collar 96, about the stem, a spring 100, and between it and the collar 97, about the tube, a spring 101. This cushioning support for the motor takes up the vibrations of the engine and prevents them from being felt in the boat.

The engine illustrated and described is the four-cycle type. To start it, the crank-handle 91 is manipulated to rotate the starting-rod 29 and through the gearing 30, 20 actuate the piston 26 to draw gas into the chamber 33 by the suction-effect of the downstroke of the piston upon the valve 78, to open the latter. Thus rotating the starting-rod actuates the sparking-plug to ignite the charge in the explosion-chamber while under compression from the piston, all as is usual in this type of engine. The parts are so timed that after each explosion the cam 31 will raise the plunger 40 to lift the valve 37 from its seat and permit the exhaust through the outlet 34 and port 36 into the tube 28, which is equipped, near its upper end, with a muffler 102 of suitable construction, such as that shown in detail in Fig. 3. By thus taking the exhaust through the stem 28 the provision for the exhaust is rendered peculiarly simple and compact. It will also be observed that the throttling of the gas-supply is effected at a point so far away from the mixing-chamber as to enable the mixing-tube to be provided of comparatively great length, with the advantage of insuring thoroughness in the mixture of the charge.

With the motor in operative position on the boat, the engine is submerged in the water and is thus water-jacketed in the most effective manner; and with the supply-tank for gasolene supported on the upper end of the stem 28, it is outside of the boat, so that leakage from it cannot take place into the boat where it would be dangerous, owing to liability of ignition and consequent accident.

The described construction of sparking-plug-controlling mechanism is peculiarly simple and effective for regulating the speed of the engine by positioning the spring 89 with reference to the finger 90, to produce the contact at any desired point in the rotation of the contact-finger, depending on the position to which the spring is brought by turning the handle 84 on the segment 85. Moreover, by providing the cam-carrying rod 29 with the valve-gear connections thereof, the starting mechanism is brought into a position of most ready accessibility for its manipulation.

It will be observed that the manner of supporting the motor in the bracket, through the medium of a stem carrying the motor and rotatably carried by the bracket, permits the motor, when in operative position on a boat, to be turned to any desired angle for steering under the action of the rotating propeller. By this ready steering function of the motor, it serves, as is shown in practice, to turn around, within its own length, a boat as long as thirty feet. Furthermore, it will be apparent that by the described construction, turning the motor a half revolution in the bracket from the position shown, will cause it to propel the boat in the backward direction, thus avoiding any necessity for reversing the engine for the purpose.

What I claim as new, and desire to secure by Letters Patent, is—

1. In combination, a combined submergible gas-engine and boat-propeller, a stem forming the carrying medium therefor, a bracket removably attachable to the stern of a boat and on which said stem is rotatably supported, a cushioning support for the stem on the bracket, and a tiller connected with the stem.

2. In combination, a combined submergible gas-engine and boat-propeller, a stem forming the carrying medium therefor, a bracket removably attachable to the stern of a boat and on which said stem is rotatably supported, and a spring medium supporting said stem on the bracket and forming a vibration-absorbing cushion.

3. In combination, a combined submergible gas-engine and boat-propeller, a stem forming the carrying medium therefor, a bracket removably attachable to the stern of a boat and provided with collars in which said stem is journaled, a collar secured on the stem between said bracket-collars, and springs confined about the stem between the collar secured thereon and said bracket-collars.

4. In combination, a combined submergible gas-engine and boat-propeller, a tubular stem forming the carrying medium therefor, and into which the engine exhausts, a muffler on said stem, and a bracket removably attachable to the stern of a boat and on which said stem is rotatably supported.

5. In combination, a combined submergible gas-engine and boat-propeller having a stem forming the carrying medium therefor, a gasolene-supply tank, an adjustable electrical contact-device supported on said stem for controlling the operation of the sparking-plug of the engine, and a bracket removably attachable to the stern of a boat and on which said stem is rotatably supported.

6. In combination, a combined submergible gas-engine and boat-propeller having a stem forming the carrying medium therefor, a gasolene-supply tank supported on the upper end of said stem, a valved mixing-tube leading from a point adjacent to said tank to the mixing-chamber of the engine, and a bracket removably attachable to the stern of a boat and on which said stem is rotatably supported.

7. In combination, a combined submergible gas-engine and boat-propeller having a tubular stem forming the carrying medium therefor, and by which the motor is adapted to be supported on a boat, with the exhaust from the explosion-chamber of the engine opening into said stem, and a muffler on said stem.

8. In combination, a submergible casing containing a gas-engine and carrying a propeller connected therewith to form a motor, a tubular stem forming the carrying medium for said motor, a starting-rod journaled in said stem and having a gear-connection with the engine, and manually-operated starting mechanism supported on said rod.

9. In combination, a submergible casing containing a gas-engine and carrying a propeller connected therewith to form a motor, a tubular stem forming the carrying medium for said motor, a starting-rod journaled in said stem and having a gear-connection with the engine, and adjustable electrical contact-mechanism for the sparking-plug of the engine, supported on said stem and rod.

10. In combination, a submergible casing containing a gas-engine and carrying a propeller connected therewith to form a motor, a tubular stem forming the carrying medium for said motor, a starting-rod journaled in said stem and having a gear-connection with the engine, and electrical contact-mechanism for the sparking-plug of the engine, consisting of a contact-finger secured on said rod near its upper end, a handle rotatably supported on the upper end of said stem and an insulated contact-spring on said handle adapted to be connected in an electric circuit.

THOMAS THORSEN.

In presence of—
  JOHN HOPWOOD,
  C. E. FREEMAN.